(12) United States Patent
Lambert et al.

(10) Patent No.: US 8,977,090 B2
(45) Date of Patent: Mar. 10, 2015

(54) CONTOURED DISPLAY

(71) Applicant: Delphi Technologies, Inc., Troy, MI (US)

(72) Inventors: David K. Lambert, Sterling Heights, MI (US); Steven A. Liburdi, Grosse Pointe Farms, MI (US); Dwadasi H. R. Sarma, West Lafayette, IN (US); Kris A. Stark, Carmel, IN (US); Gail M. Sylvester, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 105 days.

(21) Appl. No.: 13/688,765

(22) Filed: Nov. 29, 2012

(65) Prior Publication Data

US 2014/0147087 A1    May 29, 2014

(51) Int. Cl.
*G02B 6/06* (2006.01)
*G02B 6/08* (2006.01)

(52) U.S. Cl.
CPC ... *G02B 6/08* (2013.01); *G02B 6/06* (2013.01)
USPC ............................................. 385/116

(58) Field of Classification Search
CPC .............. G02B 6/04; G02B 6/06; G02B 6/08
USPC ............................................. 385/116
See application file for complete search history.

(56) References Cited

U.S. PATENT DOCUMENTS

| | | | |
|---|---|---|---|
| 5,181,130 A | | 1/1993 | Hubby, Jr. |
| 5,303,085 A | * | 4/1994 | Rallison ............. 359/631 |
| 5,928,819 A | | 7/1999 | Crawford et al. |
| 6,160,606 A | | 12/2000 | Sprague |
| 6,487,351 B1 | | 11/2002 | Cryan et al. |
| 6,682,875 B2 | | 1/2004 | Kriksunov et al. |
| 7,149,393 B2 | | 12/2006 | Kerr et al. |
| 7,209,616 B2 | | 4/2007 | Welker et al. |
| 7,376,314 B2 | | 5/2008 | Reininger |
| 7,513,642 B2 | | 4/2009 | Sormani |
| 7,892,381 B2 | | 2/2011 | Kerr et al. |

* cited by examiner

*Primary Examiner* — Jerry Blevins
(74) *Attorney, Agent, or Firm* — Lawrence D. Hazelton

(57) ABSTRACT

A contoured display that includes a faceplate configured to propagate an image in a collimated manner from an interface surface of the faceplate configured to receive the image from a display device to a display surface of the faceplate. The display surface is contoured to provide a three-dimensional (3D) contoured surface that provides designers with artistic freedom when designing a display shape, and a convenient way to contour a display surface to reduce the effects of glare on the display surface.

13 Claims, 2 Drawing Sheets

CONTOURED DISPLAY

TECHNICAL FIELD OF INVENTION

This disclosure generally relates to a contoured display having a contoured display surface, and more particularly relates to a faceplate for the display shaped to define a contoured surface for the display.

BACKGROUND OF INVENTION

Automobile designers have expressed a desire for decorative information displays that have three-dimensional (3D) surface shapes for displaying an image. That is, a desire for displays that have display surfaces other than flat, one-dimensional shapes, and other than two-dimensional surface shapes comparable to part of the outside surface of a tube or pipe. Such 3D shaped surface displays are expected to be more aesthetically pleasing than a flat display, and can be designed to be less susceptible to being obscured by glare from sunlight or other ambient light sources.

SUMMARY OF THE INVENTION

In accordance with one embodiment, a contoured display is provided. The contoured display includes an image device and a faceplate. The image device is configured to output an image. The faceplate is configured to propagate the image in a collimated manner from an interface surface of the faceplate to a display surface of the faceplate. The display surface is a contoured surface.

In accordance with one embodiment, the faceplate is formed of a plurality of parallel optical fibers. Each optical fiber has a first end and a second end opposite the first end. The first ends of the optical fibers cooperate to define the interface surface of the faceplate in a manner effective to couple optically with the image device to propagate the image into the optical fibers. The second ends of the optical fibers cooperate to define the display surface of the faceplate in a manner effective to display the image on the display surface.

In another embodiment, a faceplate for a contoured display is provided. The faceplate includes an interface surface, a body, and a display surface. The interface surface is configured to receive an image from an image device. The body is configured to propagate the image from the interface surface in a collimated manner. The display surface is configured to display the image propagated through the body, wherein the display surface is a contoured surface.

In accordance with one embodiment, the body is formed of a plurality of parallel optical fibers. Each optical fiber includes a first end and a second end opposite the first end. The first ends of the optical fibers cooperate to define the interface surface of the faceplate in a manner effective to couple optically with the image device to propagate the image into the optical fibers. The second ends of the optical fibers cooperate to define the display surface of the faceplate in a manner effective to display the image on the display surface, wherein the display surface is a contoured surface.

In another embodiment, a faceplate for a contoured display is provided. The faceplate is configured to propagate the image in a collimated manner from an interface surface receiving an image from an image device to a display surface of the faceplate The faceplate includes a plurality of parallel optical fibers. Each optical fiber has a first end and a second end opposite the first end. The first ends of the optical fibers cooperate to define the interface surface of the faceplate in a manner effective to couple optically with the image device to propagate the image into the optical fibers. The second ends of the optical fibers cooperate to define the display surface of the faceplate in a manner effective to display the image on the display surface, wherein the display surface is a contoured surface.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
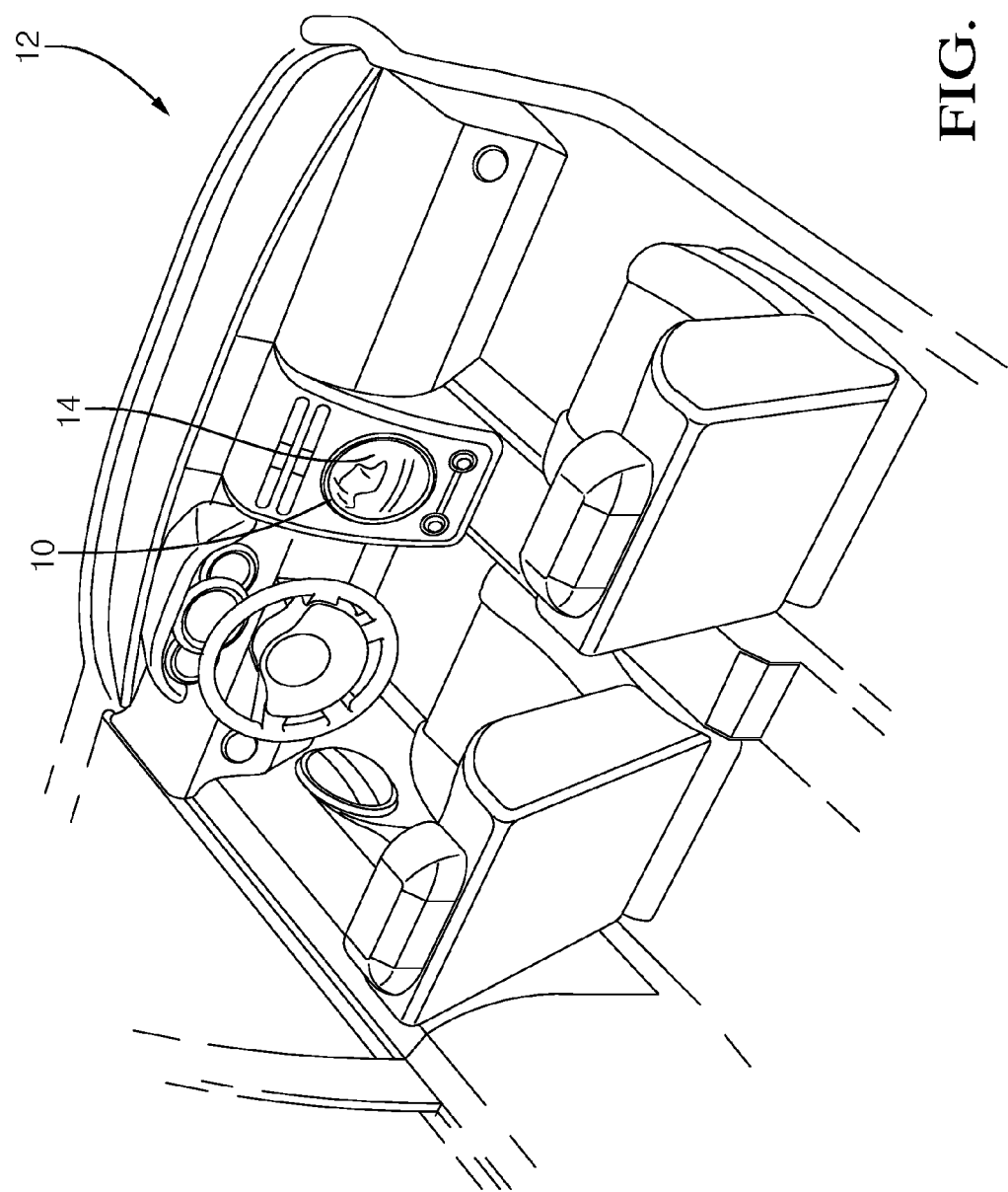
FIG. 1 is a perspective view of a vehicle interior equipped with a contoured display in accordance with one embodiment.

FIG. 1 illustrates a non-limiting example of a contoured display, hereafter the display 10, installed in a vehicle 12. As used herein, a contoured display has a display surface 14 that is shaped or contoured in three dimensions, and a flat display surface is specifically excluded from the definition of a contoured display. For example, the display surface 14 may have a shape that corresponds to a portion of the curved surface of a hemisphere surface as shown in FIG. 1. The display 10 may be a general-purpose display that is reconfigurable to display, for example, navigation information, or vehicle operation information such as vehicle interior environmental control settings, engine operating parameters, or vehicle speed. The display 10 may also be used to provide a decorative light source. The teachings set forth herein may also be used to form control knobs with a display surface having ridges or other unique features that are illuminated to give an operator of the control knob visual cues when operating the control knob. A practical advantage of the display 10 having a display surface 14 that can be formed to any contoured shape is to help prevent sun glare from obscuring the image displayed. As an added advantage, convex or concave shapes may be used to define the shape of the display surface 14 to expand or restrict the range of directions from which display surface 14 may be viewed. For example, a convex surface is viewable from a wider range of directions than is a concave surface. In a vehicle, the display surface 14 may include multiple viewable zones, where each zone is configured for viewing by different occupants in the vehicle. For example, a dual-zone temperature control display may include one viewable zone visible only to the driver, and another viewable zone visible only to the front seat passenger. As an additional advantage, the surface generating capabilities of a computer aided design program may be used by a display stylist to shape strategically the display surface 14 to blend seamlessly with vehicle interior surfaces surrounding the display surface 14. It is contemplated that other devices such as smart phones, computer displays, remote controls, or entertainment devices may advantageously incorporate the features of the display 10 set forth herein.

Figure 2:
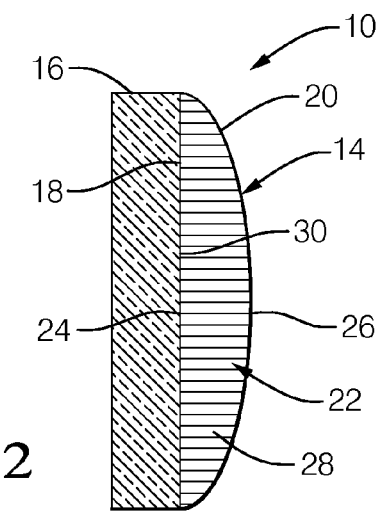
FIG. 2 is a side view of the contoured display in FIG. 1 in accordance with one embodiment.

FIG. 2 illustrates a non-limiting example of the display 10. In general, the display 10 includes an image device 16 configured to output an image. By way of example and not limitation, the image device 16 may output the image onto an output surface 18 of the image device 16. The image device 16 may be any of several known, reconfigurable display types such as an organic light emitting diode (OLED) display, or a liquid crystal device (LCD) display. Such displays are readily available in a variety of sizes and resolutions. Alternatively, if the display 10 is being configured to be part of a control knob or merely decorative, the image device 16 may include one or more light sources such as light emitting diodes configured to emit an image characterized as having variable hue and intensity across the output surface 18. Alternatively, the image device 16 may include a variably colored film or silhouette (not shown) configured to overlay the output surface 18 and form an image when appropriately backlit. Alternatively, the image device 16 may be a vectored laser or other such image projection device as will be recognized by those in the art.

The image device 16 may receive control signals from a controller (not shown). The controller may include a processor such as a microprocessor or other control circuitry as should be evident to those in the art. The controller may include memory, including non-volatile memory, such as electrically erasable programmable read-only memory (EEPROM) for storing one or more routines and/or data. The one or more routines may be executed by the processor to perform steps for outputting an image as described herein.

In general, the display 10 also includes a faceplate 20 configured to propagate the image through a body 28 of the faceplate 20, and propagate the image in a collimated manner from an interface surface 30 of the faceplate 20 to the display surface 14 of the faceplate 20, which is also the display surface 14 of the display 10. As used herein, an image that propagates through the faceplate 20 in a collimated manner means that the distance between the interface surface 30 and the display surface 14 does not influence the image present at any plane within the faceplate when the plane is substantially parallel to the interface surface 30. In other words, once pixels of the image enter the faceplate 20, the relative relationship of the pixels is maintained as the image propagates through the faceplate 20.

By way of example and not limitation, the body 28 of the faceplate 20 may be formed of a plurality of parallel optical fibers 22. In this example, each of the optical fibers 22 may be characterized as having a first end 24 and a second end 26 opposite the first end 24. The first ends 24 of the optical fibers 22 forming the faceplate 20 are processed so the first ends 24 cooperate to define the interface surface 30 of the faceplate 20. This processing prepares the interface surface 30 to be effective to couple optically with the image device 16 in order to propagate the image into the optical fibers 22. The second ends 26 of the optical fibers 22 may be similarly processed in order to cooperate to define the contour of the display surface 14 of the faceplate 20. The second ends 26 may be further processed to prepare the display surface 14 in a manner effective to display the image on the display surface 14. It should be recognized that the second ends 26 of the optical fibers 22 might not be perpendicular to the output surface 18. Consequently, portions of the image on display surface 14 may be expanded relative to the image present on the output surface 18 by a geometrical factor, and this image expansion may be used advantageously to display special effects when the display surface 14 is viewed from a direction off-axis to an axis normal to the image device 16.

Ways to form bundles of parallel optical fibers, and other materials having a similar collimated propagation characteristic, are known. U.S. Pat. No. 5,928,819 issued to Crawford et al. on Jul. 27, 1999 describes a method for making plates that have columnar features for light propagation, and U.S. Pat. No. 6,487,351 issued to Cryan et al. on Nov. 26, 2002 describes a fiber optic faceplates formed of parallel optical fibers. However, both surfaces of the faceplates shown in these references are flat. U.S. Pat. No. 7,149,393 issued to Kerr et al. on Dec. 12, 2006, and U.S. Pat. No. 7,376,314 issued to Reininger on May 20, 2008 show examples of faceplates where the optical fibers are arranged to fan-out, and so do not conform to the definition of a faceplate configured to 'propagate the image in a collimated manner'. Solid material composed of bundles of parallel optical fibers is available from Schott North America, Inc., Southbridge, Mass.; from Fused Fiberoptics, Southbridge, Mass.; and from Incom, Inc., Charlton, Mass. Material with either glass or plastic fibers is available. The natural material Ulexite has similar optical properties to an array of fibers, although in the natural state it is usually colored by impurities, and so may be undesirable as a material to form faceplates for some application that require high optical clarity.

The first ends 24, or the interface surface 30 of the faceplate 20 may be processed using grinding and polishing processes that are well known in the lens manufacturing arts. Preferably, the interface surface 30/first ends 24 are polished to have an optically clear finish so that light emitted by the image device 16 is readily propagated into the faceplate 20.

The second ends 26, or the display surface 14 of the faceplate 20 may also be processed using known machining, grinding and polishing processes to provide the desired contour to the display surface 14. As an example, solid material composed of glass optical fibers obtained from Fused Fiberoptics was successfully machined to a have a contoured surface using a numerically controlled milling machine. A 4.76 millimeters diameter carbide ball-mill was used at a rotating speed of about 3500 revolutions per minute and with a feed rate of about 38 centimeters per minute to shape the material to produce a contoured surface. The contoured surface was first shaped using rough cuts with a horizontal step size of about 0.64 millimeters and a vertical step size of about 0.51 millimeters. The finish cut used a horizontal step size of about 0.25 millimeters and a vertical step size of about 0.25 millimeters. The contoured surface was then polished. This method may be used to fabricate almost any surface contour envisioned by a designer or stylist.

A process by which the surface contour envisioned by an industrial designer or stylist can be realized is for the industrial designer or stylist to first create a styling model, using a software tool such as Alias available from Autodesk, which shows how the three dimensional surface is intended to appear. A mechanical designer begins with the styling model and uses a computer aided design program such as Unigraphics or Catia to create a solid model that specifies the surface contour as coordinates in three-dimensional space. The solid model is used to fabricate an actual part, as for example with a computer aided milling machine or with stereolithography.

It may be desirable for the display surface 14/second ends 26 of the faceplate 20 to be etched chemically or mechanically to provide a frosted or diffusive finish so that light that propagates through the faceplate 20 is emitted into a more uniform angular distribution from the display surface 14.

Continuing to refer to FIG. 2, the output surface 18 of the image device 16 is typically flat as is the case for many available displays, such as OLED displays. As such, the interface surface 30 is preferably flat so that the interface surface 30 can be located closely, preferably in contact with the output surface 18. Having the interface surface 30 in contact with the output surface 18 is preferable so that light output by the image device 16 to form the image is not excessively diffused or scattered before that light is propagated into the faceplate 20. Excessive diffusion may cause the image seen on the display surface 14 to appear unfocused or blurry. Furthermore, if light emitted by the image device 16 is not coupled into the faceplate 20, but instead escapes to elsewhere, the brightness of the image on the display surface 14 may be undesirably reduced. Accordingly, it may be preferable to use an image device 16 such as an OLED type display that either does not include the normal protective cover plate over the elements of the image device 16 that output the image, or uses a thinner than normal protective cover plate. That way, the interface surface 30 can be positioned as close as possible to the elements of the image device 16 that output the image to minimize un-collimated light propagation.

Figure 3:
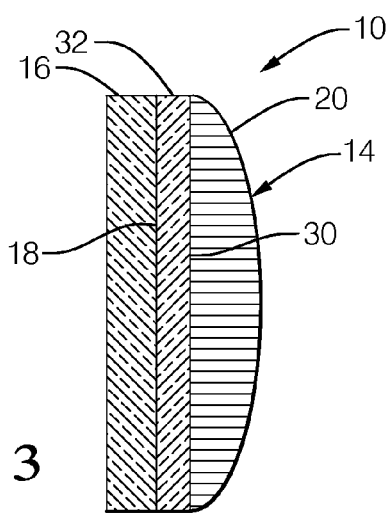
FIG. 3 is a side view of the contoured display in FIG. 1 in accordance with one embodiment.

FIG. 3 illustrates another non-limiting example the display 10 that includes an intermediate plate 32 interposed between the image device 16 and the faceplate 20. In general, the intermediate plate 32 is configured to propagate the image in a collimated manner from the image device 16 to the faceplate 20. As noted above, it is desirable to minimize the distance that light of an image propagates in an un-collimated manner. However, it may not be convenient for a display manufacturer to attach the faceplate 20 to the image device 16 when the image device 16 is fabricated. Furthermore, it may be preferable to process the faceplate 20 to have the desired contour at a manufacturing facility different from where the image device 16 is manufactured. In this example, the intermediate plate 32 is flat on both the side adjacent the output surface 18, and the side adjacent the interface surface 30. As such, it may be convenient to install the intermediate plate 32 as a protective cover instead of a glass layer when the image device 16 is manufactured, and then later, possibly at a different manufacturing facility, attach the faceplate 20 to the assembly formed by the image device 16 and the intermediate plate 32. Such an arrangement provides a way to minimize the distance of un-collimated light propagation, but keeps the manufacturing processing of the image device and the faceplate 20 conveniently independent. The intermediate plate 32 may be formed of materials similar to those used to form the faceplate 20, such as a plurality of parallel optical fibers.

Figure 4:
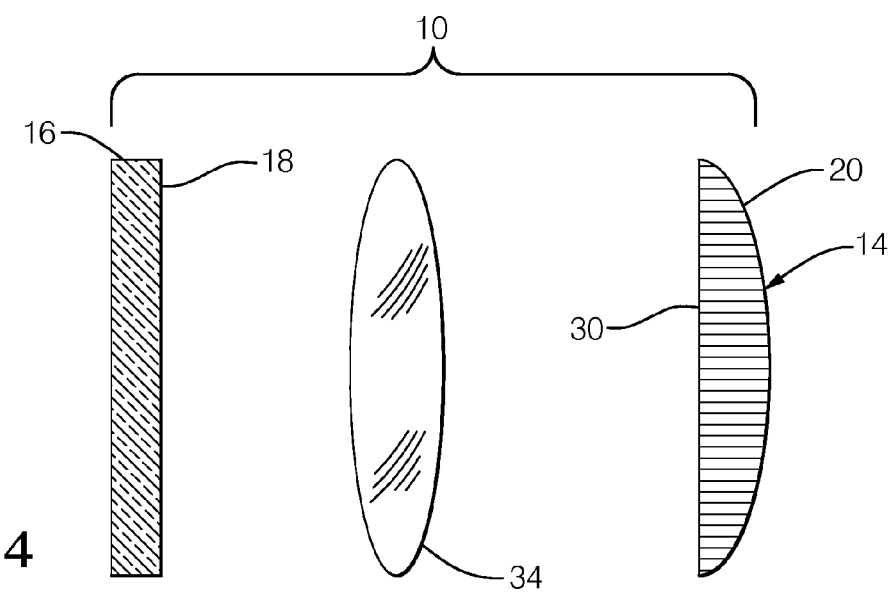
FIG. 4 is a side view of the contoured display in FIG. 1 in accordance with one embodiment.

FIG. 4 illustrates another non-limiting example of the display 10 that includes an intermediate lens 34 interposed between the image device 16 and the faceplate 20. In general, the intermediate lens 34 is configured to focus the image shown on the output surface 18 of the image device 16 onto the interface surface 30 of the faceplate 20. The intermediate lens 34 allows the faceplate 20 to be spaced apart from the image device 16 without causing a loss of focus or clarity of the image. The intermediate lens 34 is illustrated as a simple lens only to simplify explanation. It is recognized that the intermediate lens 34 may include a plurality of lenses, minors (curved or flat), and other optical devices to focus the image output by the image device 16 from the output surface 18 onto the interface surface 30 of the faceplate 20. However, it is recognized that this arrangement using the intermediate lens 34 may reduce the brightness of the image shown on the display surface 14. An advantage of this arrangement is that the image device may include a simple glass plate protective cover instead of the intermediate plate suggested in FIG. 3. Such an arrangement would not suffer from a loss of image clarity at the display surface 14 because the effects of un-collimated light propagation between the image device 16 and the faceplate 20 are corrected by the intermediate lens 34.

Accordingly, a contoured display (the display 10), and a contoured faceplate (the faceplate 20) for the display 10 is provided. The display 10 and the faceplate 20 provide a way to transfer a two-dimensional image from a conventional flat-panel display to a three-dimensional surface so the image appears to be localized on the three-dimensional surface (the display surface 14) of the faceplate. The display 10 fulfills the desire of vehicle designers to create a reconfigurable image on the surface of a three-dimensional shape and not be limited to a flat display surface. Potential applications include the display for the center stack in a vehicle, and reconfigurable graphics on knobs and curved surfaces in vehicles. In addition to a designed three-dimensional shape being an artistic expression in a vehicle cockpit, such a shape has practical advantages such as helping to prevent sun glare from obscuring the image for the viewer.

While this invention has been described in terms of the preferred embodiments thereof, it is not intended to be so limited, but rather only to the extent set forth in the claims that follow.

We claim:

1. A contoured display comprising:
an image device configured to output an image; and
a faceplate configured to propagate the image in a collimated manner from an interface surface of the faceplate to a display surface of the faceplate, wherein the display surface is a contoured surface, wherein the faceplate is formed of a plurality of parallel optical fibers, each optical fiber having a first end and a second end opposite the first end, wherein the first ends of the optical fibers cooperate to define the interface surface of the faceplate in a manner effective to couple optically with the image device to propagate the image into the optical fibers, and the second ends of the optical fibers cooperate to define the display surface of the faceplate in a manner effective to display the image on the display surface.

2. The display in accordance with claim 1, wherein the display surface has a surface-finish configured to emit diffusively light that propagated through the plurality of parallel optical fibers.

3. The display in accordance with claim 1, wherein the display surface has a shape that corresponds to a portion of the curved surface of a hemisphere surface.

4. The display in accordance with claim 1, wherein the image device comprises a flat image-surface.

5. The display in accordance with claim 4, wherein the interface surface contacts the flat image-surface.

6. The display in accordance with claim 1, wherein the display further comprises an intermediate plate interposed between the image device and the faceplate, and configured to propagate the image in a collimated manner from the image device to the faceplate.

7. The display in accordance with claim 1, wherein the display further comprises an intermediate lens interposed between the image device and the faceplate, said intermediate lens configured to focus the image on the interface surface.

8. A faceplate for a contoured display, said faceplate comprising:
an interface surface configured to receive an image from an image device;
a body configured to propagate the image in a collimated manner; and
a display surface configured to display the image propagated through the body, wherein the display surface is a contoured surface, wherein the body is formed of a plurality of parallel optical fibers, each optical fiber having a first end and a second end opposite the first end, wherein the first ends of the optical fibers cooperate to define the interface surface of the faceplate in a manner effective to couple optically with the image device to propagate the image into the optical fibers, and the second ends of the optical fibers cooperate to define the display surface of the faceplate in a manner effective to display the image on the display surface, wherein the display surface is a contoured surface.

9. The faceplate in accordance with claim 8, wherein the display surface has a shape that corresponds to a portion of the curved surface of a hemisphere surface.

10. The display in accordance with claim 8, wherein second end of each optical fiber has a surface-finish configured to emit diffusively light that propagated through the optical fiber.

11. The display in accordance with claim 8, wherein the image device comprises a flat image-surface.

12. The display in accordance with claim 11, wherein the interface surface contacts the flat image-surface.

13. The display in accordance with claim 8, wherein the display further comprises an intermediate plate interposed between the image device and the faceplate, and configured to propagate the image in a collimated manner from the image device to the faceplate.

\* \* \* \* \*